(12) United States Patent
Kim

(10) Patent No.: US 6,778,456 B2
(45) Date of Patent: Aug. 17, 2004

(54) TEMPERATURE DETECTING CIRCUIT

(75) Inventor: Saeng Hwan Kim, Kyungki-Do (KR)

(73) Assignee: Hynix Semiconductor Inc., Kyungki-do (KR)

( * ) Notice: Subject to any disclaimer, the term of this patent is extended or adjusted under 35 U.S.C. 154(b) by 0 days.

(21) Appl. No.: 10/331,251

(22) Filed: Dec. 30, 2002

(65) Prior Publication Data

US 2004/0013161 A1 Jan. 22, 2004

(30) Foreign Application Priority Data

Jul. 18, 2002 (KR) .................................. 10-2002-0042179

(51) Int. Cl.$^7$ ................................................. G11C 7/00
(52) U.S. Cl. ........................ 365/222; 365/194; 365/211; 327/512
(58) Field of Search ................................. 365/194, 222, 365/189.08, 211; 327/512, 513, 262, 378

(56) References Cited

U.S. PATENT DOCUMENTS

| 4,868,525 A | * | 9/1989 | Dias ........................... 331/111 |
| 5,375,093 A | * | 12/1994 | Hirano ........................ 365/222 |
| 5,724,297 A | * | 3/1998 | Noda et al. .................. 365/226 |
| 5,748,542 A | | 5/1998 | Zheng et al. ................ 365/194 |
| 5,978,297 A | * | 11/1999 | Ingalls ........................ 365/225.7 |

FOREIGN PATENT DOCUMENTS

JP          08083487 A          3/1996

* cited by examiner

Primary Examiner—Richard Elms
Assistant Examiner—Hien Nguyen
(74) Attorney, Agent, or Firm—Marshall, Gerstein & Borun LLP

(57) ABSTRACT

A temperature detector includes a pulse generator adapted to generate pulse signals based on temperature detecting signals, a first delay circuit adapted to delay the temperature detecting signals in accordance with different delay times and generate a plurality of first delayed signals, a second delay circuit adapted to delay the temperature detecting signals and generate a plurality of second delayed signals, a plurality of detectors adapted to compare the plurality of first delayed signals from the first delay circuit and the plurality of second delayed signals from the second delay circuit and generate compared values based on the pulse signals, a plurality of pads adapted to read outputs generated by the plurality of detectors, and a comparison unit adapted to compare temperature values read from the plurality of pads and current temperature values to determine an optimum detector that generates an optimum temperature value.

13 Claims, 4 Drawing Sheets

TEMPERATURE DETECTING CIRCUIT

BACKGROUND

1. Technical Field

The present disclosure relates to a temperature detecting circuit and, more particularly, to a temperature detecting circuit that is capable of selecting an optimum detector from a plurality of detectors by detecting temperatures and predicting delay variations within a possible range based on process parameters or variations in the voltage.

2. Description of the Related Art

In nonvolatile memory devices, stored data is maintained during a periodic refresh operation. A self-refresh operation requires a relatively large amount of standby current. For a refresh period, however, many differences in current exist based on temperature. If the temperature is detected and the refresh period is then changed in response to the detected temperature, the standby current may be greatly reduced. The accuracy of the temperature detector may be reduced based on external conditions such as process, voltage, and the like.

FIG. 1 is an exemplary circuit diagram that depicts a conventional temperature detecting circuit. A temperature detecting signal (compare) includes a signal that is internally produced to periodically measure the temperature, or it may include an externally inputted signal. The temperature detecting signal (compare) may be generated when the temperature is detected. In operation, the temperature detecting signal (compare) is applied to a first delay circuit 10, a second delay circuit 30, and a third delay circuit 40. The temperature detecting signal that is delayed in the first delay circuit 10 is then provided as an input to a pulse generator 20. The pulse generator 20 generates first and second pulse signals (lat and latb) in response to the delayed temperature detecting signal. In addition, each of the second delay circuit 30 and the third delay circuit 40 delays the temperature detecting signal to produce delayed signals (F1 and F2), respectively. The second delay circuit 30 is relatively sensitive to variations in temperature and voltage, while the third delay circuit 40 is relatively insensitive to variations in temperature and voltage.

Generally, the second delay circuit 30 includes a plurality of inverters. In the second delay circuit 30, a signal transfer is delayed when the temperature is high or the voltage is low. The third delay circuit 40 includes a plurality of NMOS transistors, a plurality of PMOS transistors, and a plurality of inverters. As discussed above, the third delay circuit 40 is relatively insensitive to variations in temperature or voltage. Outputs generated by the second delay circuit 30 and the third delay circuit 40 are compared in a detector 50. The detector 50 determines whether the detected temperature is higher or lower than a reference temperature based on the output. For example, in a state where the second delay circuit 30 and the third delay circuit 40 have generally similar characteristics at a specific temperature, if the detected temperature is higher than the specific temperature, the delayed temperature detecting signal F1 may reach the detector 50 slower than the delayed temperature detecting signal F2. Thus, a node F3 of the detector 50 has a HIGH state. The potential at the node F3 is stored at the latch 50a based on the first and second pulse signals (lat and latb) generated by the pulse generator 20. The refresh controller 60 performs the refresh operation based on the output (Temp_det) of the latch 50a.

Unfortunately, the characteristics of the second delay circuit 30 and the third delay circuit 40 may change depending on the process parameters, variations in voltage, and the like. Thus, the detected temperature may be different depending on the particular device.

SUMMARY

A temperature detector is adapted to select an optimum detector from a plurality of detectors by detecting the temperature using the plurality of detectors and predicting delay variations within a certain range depending on process parameters or variations in the voltage. The temperature detector includes a pulse generator adapted to generate pulse signals in response to temperature detecting signals, a first delay circuit adapted to delay the temperature detecting signals in accordance with different delay times and generate a plurality of delayed signals, a second delay circuit adapted to delay the temperature detecting signals and generate a plurality of delayed signals, a plurality of detectors adapted to compare the plurality of delayed signals generated by the first and second delay circuits and generate compared values based on the pulse signals, a plurality of pads adapted to read the compared values generated by the plurality of detectors, and a comparison unit adapted to compare the temperature values read from the plurality of pads and current temperature values and determine an optimum detector that generates an optimum temperature value.

DETAILED DESCRIPTION

Figure 2:
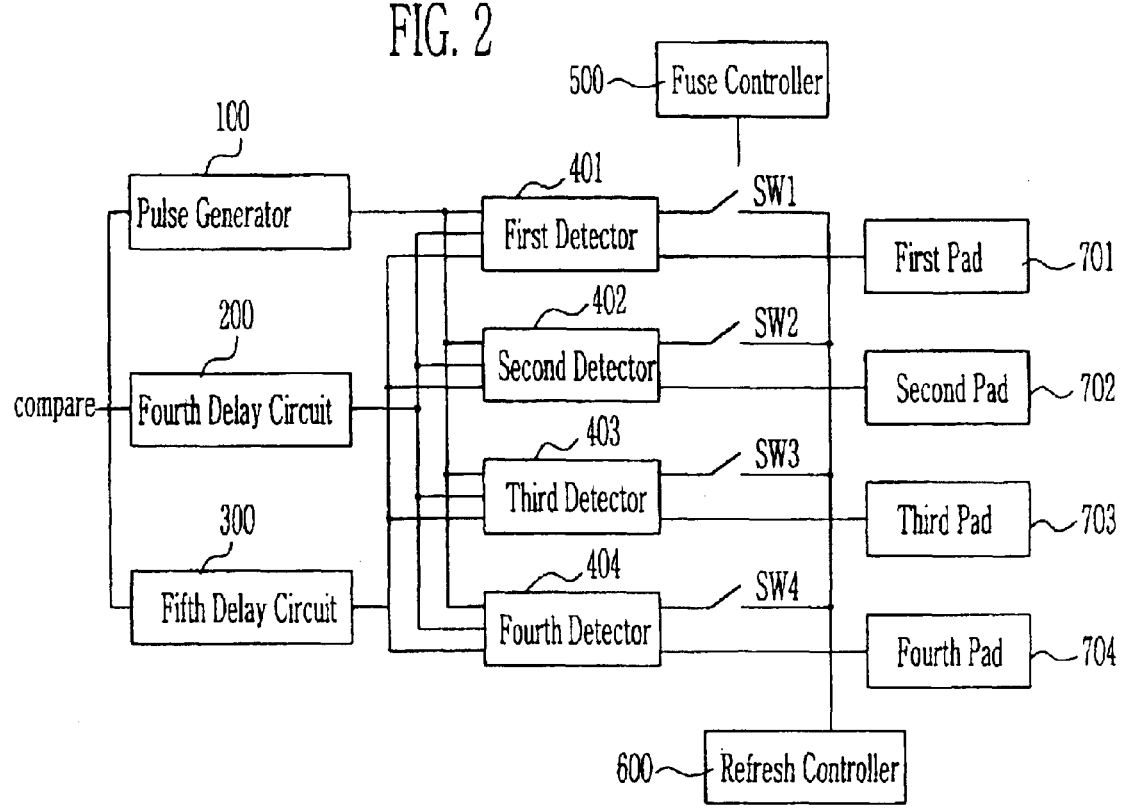
FIG. 2 is an exemplary block diagram that depicts a temperature detecting circuit according to one embodiment of the present disclosure.

FIG. 2 is an exemplary block diagram that depicts a temperature detecting circuit according to one embodiment. As shown in FIG. 2, a temperature detecting signal (compare) that is generated when the temperature is detected is provided as an input to a pulse generator 100, a fourth delay circuit 200, and a fifth delay circuit 300. The fourth delay circuit 200 is relatively sensitive to variations in temperature and voltage, while the fifth delay circuit 300 is relatively insensitive to variations in temperature and voltage. Outputs generated by the pulse generator 100, the fourth delay circuit 200, and the fifth delay circuit 300 are provided as inputs to a first detector 401, a second detector 402, a third detector 403, and a fourth detector 404.

A first pad 701, a second pad 702, a third pad 703, and a fourth pad 704 are connected to the first detector 401, the second detector 402, the third detector 403, and the fourth detector 404, respectively, and adapted to read the temperatures detected by the respective detectors. In addition, the first through fourth detectors 401~404 are connected to a refresh controller 600 via first through fourth switches SW1~SW4, respectively. The first through fourth switches SW1~SW4 are turned on or off by the output of the fuse controller 500. If the first through fourth switches SW1~SW4 are turned on by the fuse controller 500, the temperatures detected in the first through fourth detectors 401~404 are transferred to the first through fourth pads 701~704, respectively. If any one of the first through fourth detectors 401~404 is selected by the fuse controller 500 based on the temperature transferred to the first through fourth pads 701~704, the most accurate temperature for the current device may be detected.

Figure 3:
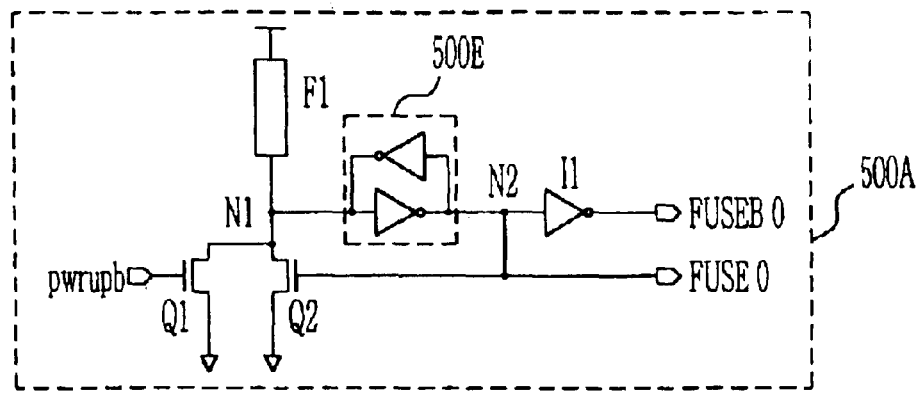
FIG. 3 is an exemplary circuit diagram that depicts a fuse controller.
Figure 3:
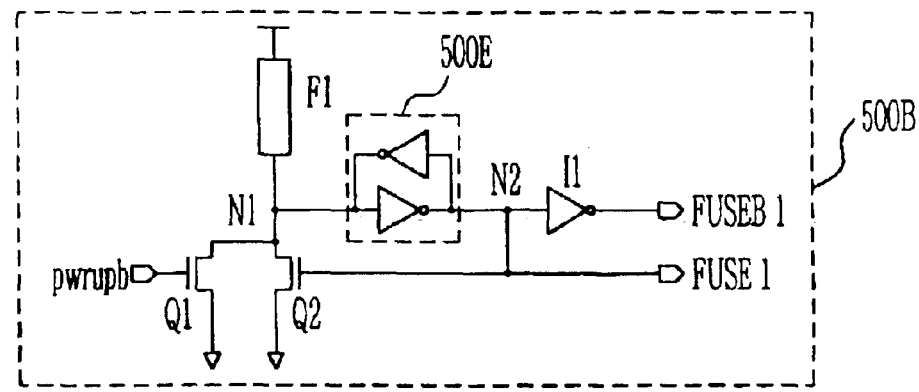
Figure 3:
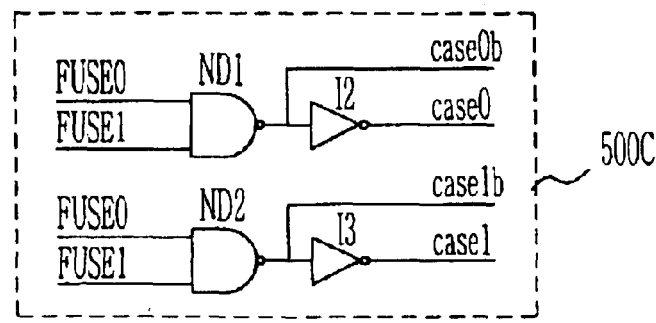
Figure 3:
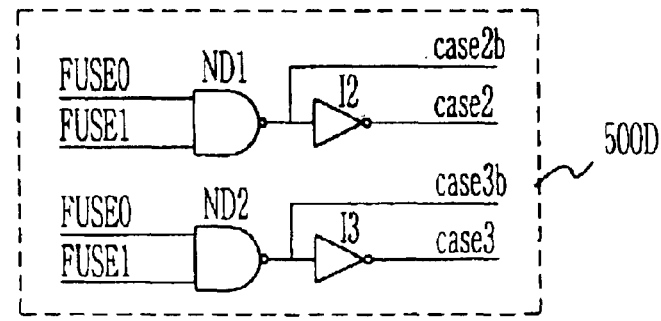

FIG. 3 is an exemplary circuit diagram that depicts the fuse controller 500 shown in FIG. 2. The fuse controller 500 includes a first fuse box 500A, a second fuse box 500B, a first fuse pulse generator 500C, and a second fuse pulse generator 500D. The first and second fuse boxes 500A and 500B have generally similar structures, and the first and the second fuse pulse generators 500C and 500D also have generally similar structures.

The first fuse box 500A includes a fuse F1 that can be trimmed. The fuse F1 is connected between the power supply and a node N1. Transistors Q1 and Q2 are connected in parallel between the node N1 and ground. The transistor Q1 is driven by, for example, a power-up (pwrupb) signal. A latch 500E having two inverters is connected between the nodes N1 and N2. The output of the latch 500E is applied to the gate of the transistor Q2 and is simultaneously inverted through an inverter I1. The output of the latch 500E is a first fuse signal (FUSE0) and the inverted output of the latch 500E is a second fuse signal (FUSEB0). The second fuse box 500B generates third and fourth fuse signals (FUSE1 and FUSEB1) by performing a similar operation to that performed by the first fuse box 500A.

The first fuse pulse generator 500C includes two NAND gates ND1 and ND2 and two inverters I2 and I3. The first and third fuse signals (FUSE0 and FUSE1) are provided as inputs to the NAND gate ND1. The output of the NAND gate ND1 is a second switching signal (case0b) and the output inverted by the inverter I2 is a first switching signal (case0). The second and fourth fuse signals (FUSEB0 and FUSEB1) are provided as inputs to a NAND gate ND2. The output of the NAND gate ND2 is a third switching signal (case1b), and the output inverted by the inverter I3 is a fourth switching signal (case1). The second fuse pulse generator 500D generates fifth, sixth, seventh and eighth switching signals case2, case2b, case3 and case3b, respectively, by performing a generally similar operation to that performed by the first fuse pulse generator 500C.

Figure 1:
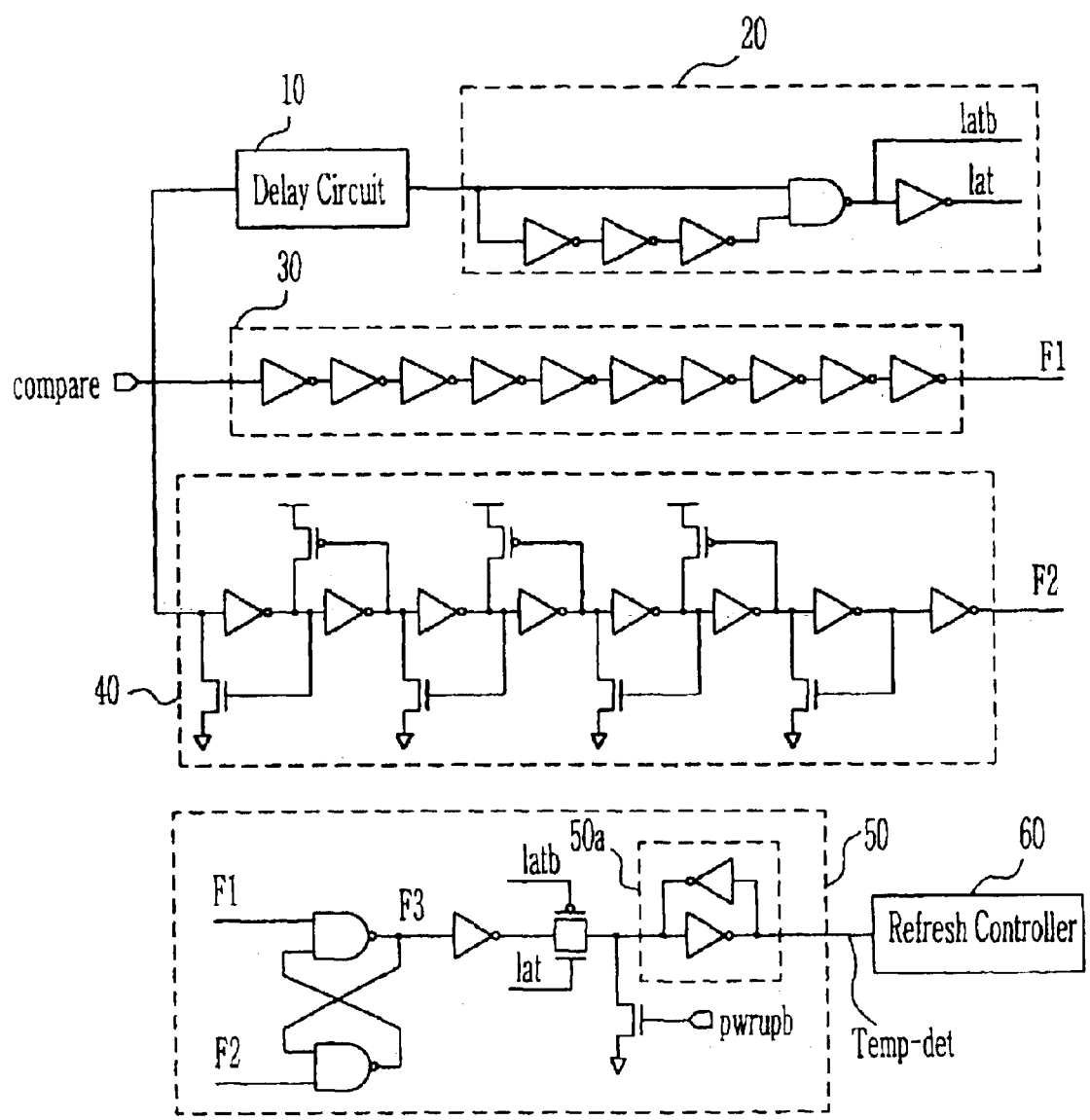
FIG. 1 is an exemplary circuit diagram that depicts a conventional temperature detecting circuit.
Figure 4:
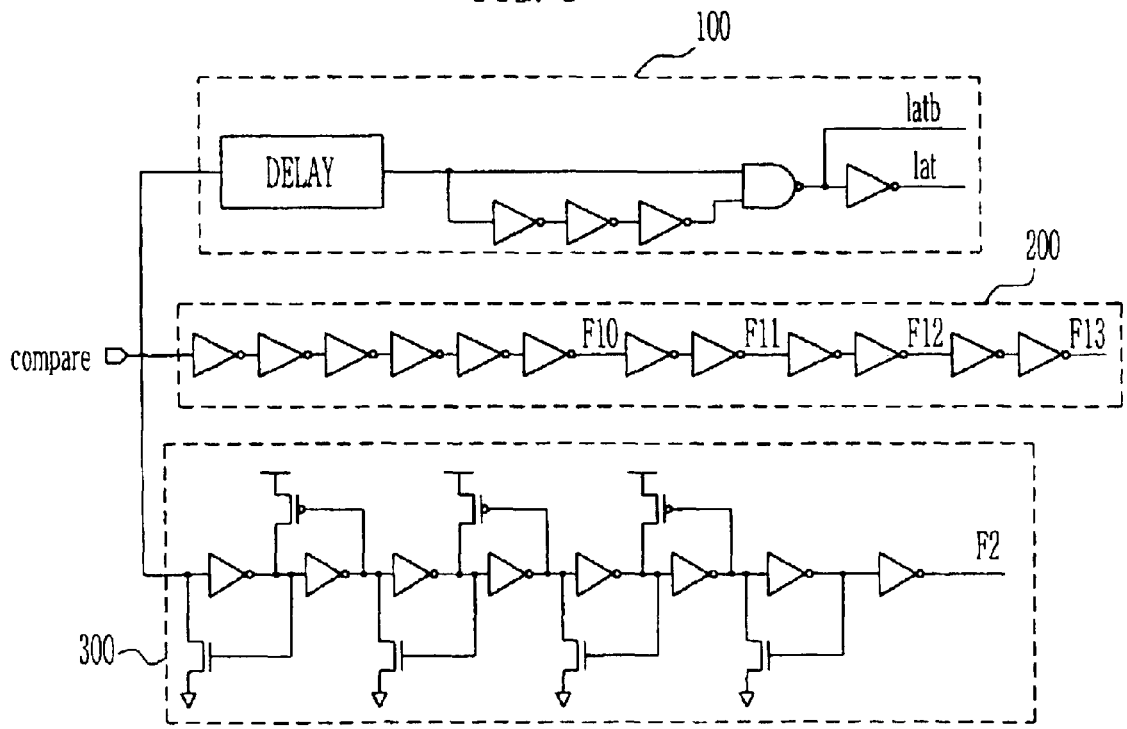
FIG. 4 is an exemplary circuit diagram that depicts a pulse generator, a fourth delay circuit, and a fifth delay circuit.

FIG. 4 is an exemplary circuit diagram that depicts the pulse generator, the fourth delay circuit, and the fifth delay circuit shown in FIG. 2. The pulse generator 100 and the fifth delay circuit 300 have generally similar constructions to those shown in FIG. 1. Therefore, a detailed discussion regarding the pulse generator 100 and the fifth delay circuit 300 is omitted.

As shown in FIG. 4, the fourth delay circuit 200 includes a plurality of inverters that generate first, second, third, and fourth delayed output signals (F10, F11, F12, and F13) that have different delay times.

Figure 5:
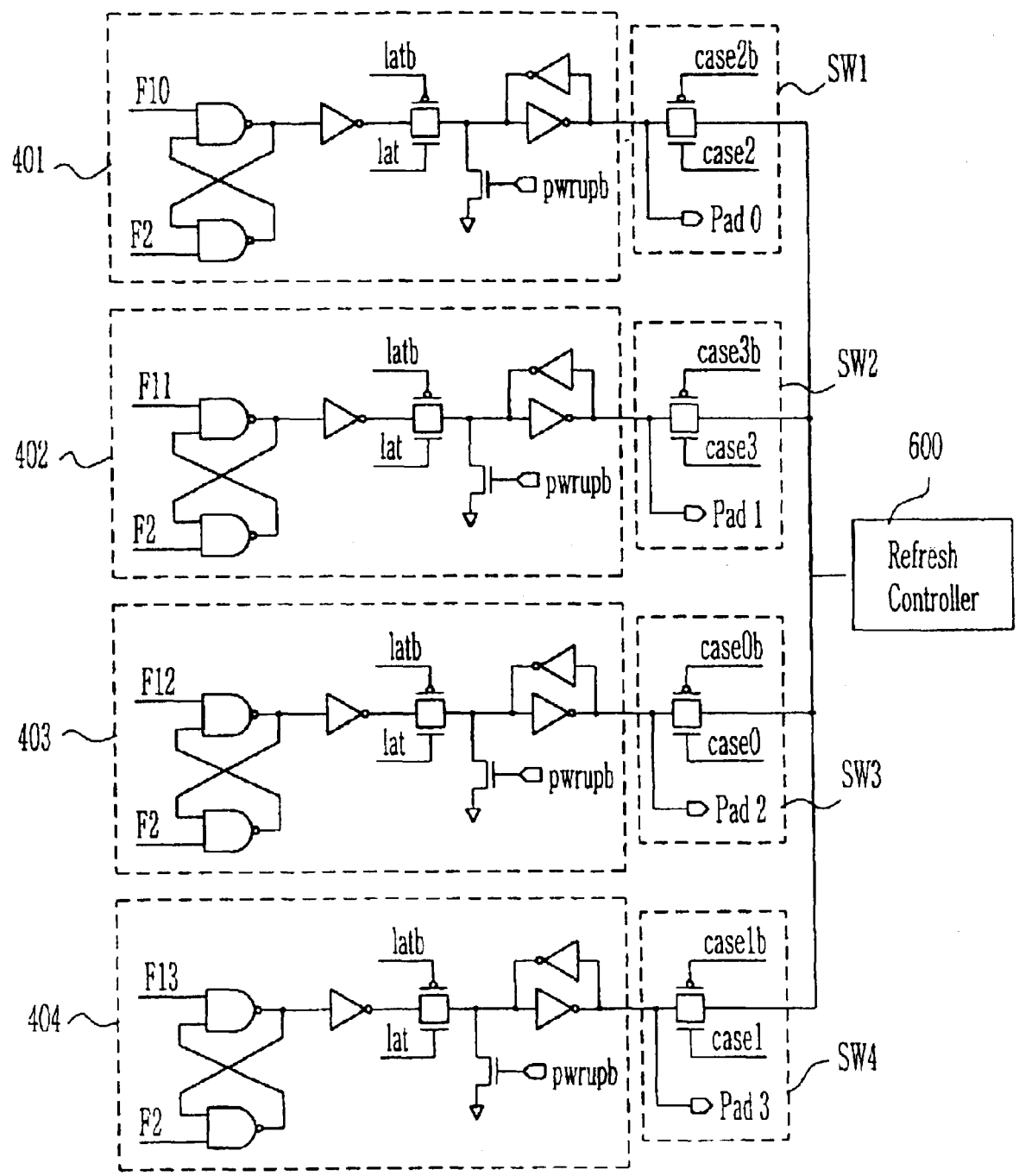
FIG. 5 is an exemplary circuit diagram that depicts a detecting unit.

FIG. 5 is an exemplary circuit diagram that depicts the first through fourth detectors 401~404 and the first through fourth switches SW1~SW4 shown in FIG. 2. The structure of each of the detectors 401~404 is generally similar to that of each of the detectors shown in FIG. 1. As shown in FIG. 5, each of the switches SW1~SW4 includes a transmission gate.

The first detector 401 compares the first delayed output signal (F10) and the output (F2) generated by the fifth delay circuit 300, and then latches the compared output based on the first and second pulse outputs (lat and latb) of the pulse generator 100. The output detected in the first detector 401 is transferred to the first pad 701. The output is also transferred to the refresh controller 600 via the transmission gate (first switch, SW1) that is driven by the fifth and sixth switching signals (case2 and case2b).

The second detector 402 compares the second delayed output signal (F11) and the output (F2) generated by the fifth delay circuit 300 and then latches the compared output based on the first and second pulse outputs (lat and latb) of the pulse generator 100. The output detected in the second detector 402 is transferred to the second pad 702. The output is also transferred to the refresh controller 600 via the transmission gate (second switch, SW2) that is driven by the seventh and eighth switching signals (case3 and case3b).

The third detector 403 compares the third delayed output signal (F12) and the output (F2) generated by the fifth delay circuit 300 and then latches the compared output based on the first and second pulse outputs (lat and latb) of the pulse generator 100. The output detected in the third detector 403 is transferred to the third pad 703. The output is also transferred to the refresh controller 600 via the transmission gate (third switch, SW3) that is driven by the first and second switching signals (case0 and case0b).

The fourth detector 404 compares the fourth delayed output signal (F13) and the output (F2) generated by the fifth delay circuit 300 and then latches the compared output based on the first and second pulse outputs (lat and latb) of the pulse generator 100. The output detected in the fourth detector 404 is transferred to the fourth pad 704. The output is also transferred to the refresh controller 600 via the transmission gate (fourth switch, SW4) that is driven by the third and fourth switching signals (case1 and case1b).

If the detected temperature is low, the first through fourth detectors 401~404 all generate output signals having a LOW level. However, as the temperature increases, the fourth delay circuit 404 generates a signal having a HIGH level and the third and second detectors 403 and 402 sequentially generate signals having a HIGH level. If the temperature is further increased, all the detectors generate output signals having a HIGH level. The detector that generates the lowest level among the outputs of the detectors is the optimum detector. The current temperature that is being tested and an internal detected temperature may be compared when this detector is connected to the refresh controller via the fuse controller 500.

As mentioned above, the disclosed temperature detectors are constructed such that a detected temperature and a reference temperature are compared. The disclosed detectors can accurately detect temperature despite variations in the process or voltage.

The disclosed temperature detectors have been described with reference to a particular embodiment in connection with a particular application. Those having ordinary skill in the art and access to the teachings of this disclosure will recognize additional modifications and applications within the scope thereof. It is therefore intended that the appended claims cover any and all such applications, modifications, and embodiments within the scope of this disclosure.

What is claimed is:

1. A temperature detector, comprising:
   a pulse generator adapted to generate pulse signals based on temperature detecting signals;
   a first delay circuit adapted to delay the temperature detecting signals in accordance with different delay times and generate a plurality of first delayed signals;
   a second delay circuit adapted to delay the temperature detecting signals and generate a plurality of second delayed signals;

a plurality of detectors adapted to compare the plurality of first delayed signals from the first delay circuit and the plurality of second delayed signals from the second delay circuit and generate compared values based on the pulse signals;

a plurality of pads adapted to read the compared values generated by the plurality of detectors; and a comparison unit adapted to compare the outputs read from the plurality of pads and current temperature values and determine an optimum detector that outputs an optimum temperature value.

2. The temperature detector according to claim 1, wherein the comparison unit includes:

a plurality of switches connected in parallel between output terminals of the plurality of detectors and a final output terminal; and a fuse controller adapted to control the plurality of switches.

3. The temperature detector according to claim 2, wherein the fuse controller includes:

a first fuse box adapted to generate first and second fuse signals, wherein the first fuse box includes a first fuse that can be trimmed;

a second fuse box adapted to generate third and fourth fuse signals, wherein the second fuse box includes a second fuse that can be trimmed;

a first fuse pulse generator adapted to generate a plurality of first switching signals based on the first, second, and third fuse signals; and a second fuse pulse generator adapted to generate a plurality of second switching signals based on the first, second, and fourth fuse signals.

4. The temperature detector according to claim 3, wherein each of the first and second fuse boxes includes:

a fuse connected between a power supply and a first node, wherein the fuse can be trimmed;

a first transistor connected between the first node and ground, wherein a control signal is applied to a gate terminal of the first transistor;

a second transistor connected in parallel to the first transistor;

a latch connected between the first node and a second node, wherein an output of the latch is applied to the second transistor and simultaneously becomes the first fuse signal; and an inverter adapted to invert the output of the latch to generate the second fuse signal.

5. The temperature detector according to claim 3, wherein the first fuse pulse generator includes:

a first NAND gate adapted to logically combine the first and second fuse signals and generate a second switching signal;

a first inverter adapted to invert an output of the first NAND gate and generate a first switching signal;

a second NAND gate adapted to logically combine the second and third fuse signals and generate a fourth switching signal; and a second inverter adapted to invert an output of the second NAND gate and generate a third switching signal.

6. The temperature detector according to claim 3, wherein the second fuse pulse generator includes:

a third NAND gate adapted to logically combine the first and fourth fuse signals and generate a sixth switching signal;

a third inverter adapted to invert an output of the third NAND gate and generate a fifth switching signal;

a fourth NAND gate adapted to logically combine the second and fourth fuse signals and generate an eighth switching signal; and a fourth inverter adapted to invert an output of the fourth NAND gate and generate a seventh switching signal.

7. The temperature detector according to claim 2, wherein each of the plurality of switches includes a transmission gate.

8. A temperature detector, comprising:

a pulse generator adapted to generate pulse signals based on temperature detecting signals;

a first delay circuit adapted to delay the temperature detecting signals in accordance with different delay times, and generate a plurality of first delayed signals;

a second delay circuit adapted to delay the temperature detecting signals, and generate a plurality of second delayed signals;

a plurality of detectors adapted to compare the plurality of first delayed signals from the first delay circuit and the plurality of second delayed signals from the second delay circuit, and generate compared values based on the pulse signals;

a plurality of pads adapted to read the compared values generated by the plurality of detectors; and a plurality of switches connected in parallel between outputs of the plurality of detectors and a final output terminal; and a fuse controller adapted to control the plurality of switches.

9. The temperature detector according to claim 8, wherein the fuse controller includes:

a first fuse box adapted to generate first and second fuse signals, wherein the first fuse box includes a first fuse that can be trimmed;

a second fuse box adapted to generate third and fourth fuse signals, wherein the second fuse box includes a second fuse that can be trimmed;

a first fuse pulse generator adapted to generate a plurality of first switching signals based on the first, second, and third fuse signals; and a second fuse pulse generator adapted to generate a plurality of second switching signals based on the first, second, and fourth fuse signals.

10. The temperature detector according to claim 9, wherein each of the first and second fuse boxes includes:

a fuse connected between a power supply and a first node, wherein the fuse can be trimmed;

a first transistor connected between the first node and ground, wherein a control signal is applied to a gate terminal of the first transistor;

a second transistor connected in parallel to the first transistor;

a latch connected between the first node and a second node, wherein an output of the latch is applied to the second transistor and simultaneously becomes a first fuse signal; and an inverter adapted to invert the output of the latch to generate a second fuse signal.

11. The temperature detector according to claim 9, wherein the first pulse generator includes:

a first NAND gate adapted to logically combine the first and second fuse signals, and generate a second switching signal;

a first inverter adapted to invert an output of the first NAND gate, and generate a first switching signal;

a second NAND gate adapted to logically combine the second and third fuse signals, and generate a fourth switching signal; and a second inverter adapted to invert an output of the second NAND gate, and generate a third switching signal.

12. The temperature detector according to claim 9, wherein the second pulse generator includes:

a third NAND gate adapted to logically combine the first and fourth fuse signals, and generate a sixth switching signal;

a third inverter adapted to invert an output of the third NAND gate, and generate a fifth switching signal;

a fourth NAND gate adapted to logically combine the second and fourth fuse signals, and generate an eighth switching signal; and a fourth inverter adapted to invert an output of the fourth NAND gate, and generate a seventh switching signal.

13. The temperature detector according to claim 8, wherein each of the plurality of switches includes a transmission gate.

* * * * *